UNITED STATES PATENT OFFICE.

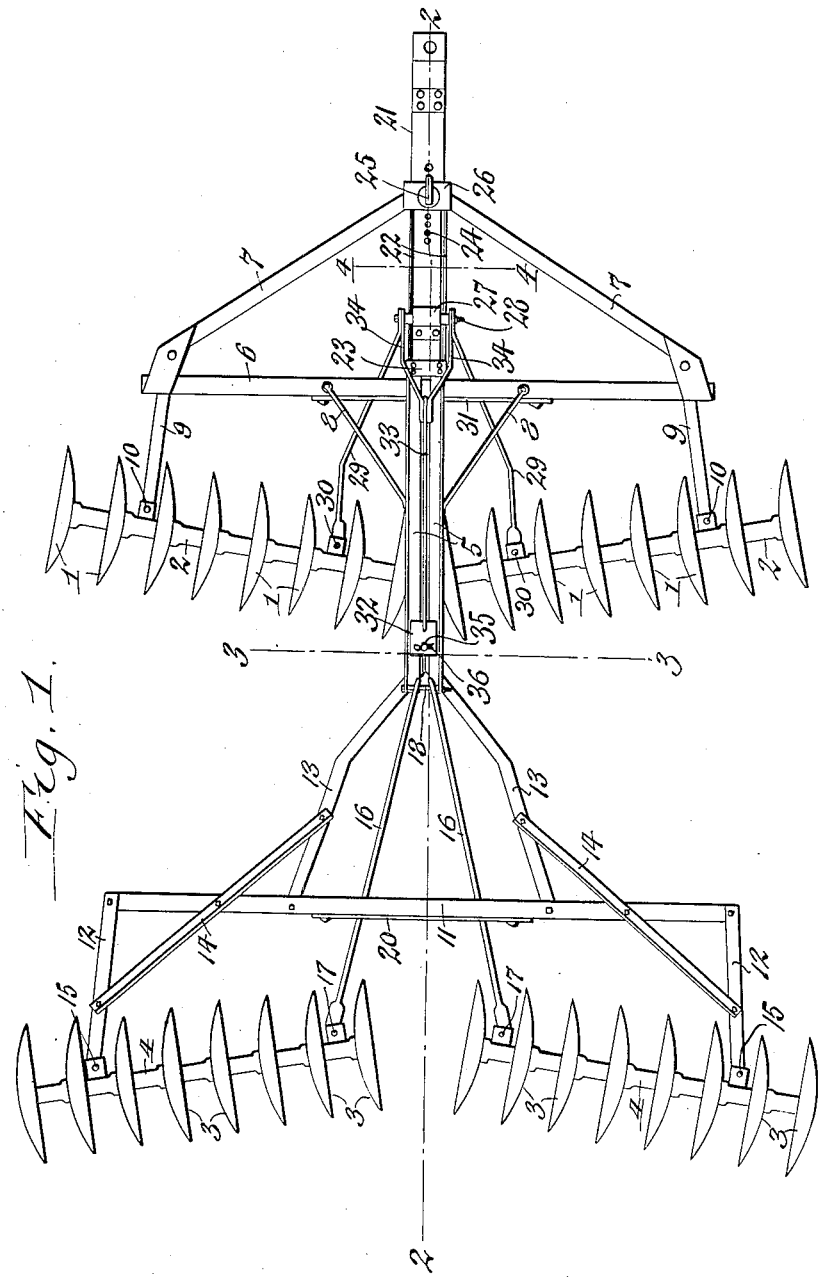

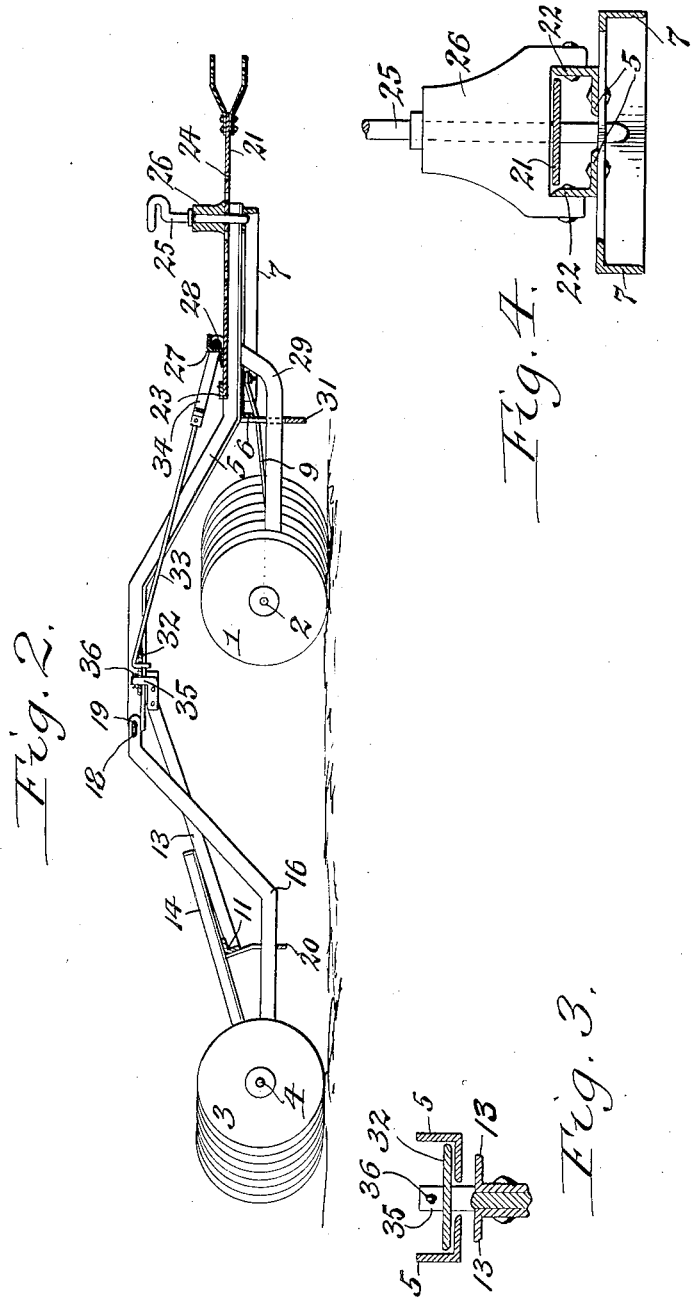

ARTHUR L. POLLARD, OF BATAVIA, NEW YORK, ASSIGNOR TO MASSEY-HARRIS HARVESTER CO. INC., OF BATAVIA, NEW YORK, A CORPORATION OF NEW YORK.

TRACTOR HARROW.

1,409,569.   Specification of Letters Patent.   Patented Mar. 14, 1922.

Application filed November 1, 1918. Serial No. 260,644.

*To all whom it may concern:*

Be it known that I, ARTHUR L. POLLARD, a citizen of the United States, residing in Batavia, in the county of Genesee and State of New York, have invented new and useful Improvements in Tractor Harrows, of which the following is a specification.

This invention relates more particularly to that class of harrows which are adapted to be drawn by means of a tractor and in which two pairs or gangs of cutter disks or similar cultivators or tools are arranged one behind the other and are capable of being adjusted in a plane parallel with the surface of the ground in order to vary the effectiveness of the harrow to suit the conditions under which the same is operated as well as to permit ease of transportation of the same when not in operation.

It is the object of this invention to provide a harrow of this character with improved means for adjusting the angularity of the gangs of disks which are of simple and inexpensive construction and capable of being readily and easily operated.

In the accompanying drawings:

Figure 1 is a top plan view of a tractor harrow embodying my invention. Figure 2 is a vertical longitudinal section of the same taken on line 2—2, Fig. 1. Figures 3 and 4 are vertical transverse sections, on an enlarged scale, taken on the correspondingly numbered lines in Fig. 1.

Similar characters of reference refer to like parts throughout the several views.

In its general organization this harrow comprises two front gangs and two rear gangs, the front gangs being provided with cultivators or tools 1, 1 which are mounted on a horizontal transverse axle 2 and the cultivators or tools 3, 3 of two rear gangs being mounted on a horizontal transverse axle 4. Each of these cultivators or tools is preferably constructed in the form of a disk having a peripheral cutting edge although the same may be otherwise constructed if desired.

Arranged in front of the front pair of the disk gangs is a front draft frame which may be of any suitable construction but in the form shown in the drawings the same comprises a guide beam formed mainly by two angle bars 5 and having their rear parts arranged adjacent to the opposing inner ends of the front gang of disks, a cross bar 6 connected with this guide beam between its front and rear ends, a pair of front braces 7 connecting the front end of the guide beam with the outer ends of the front cross bar 6, two rear braces 8 connecting the rear part of the guide beam with the intermediate parts of the cross bar 6, and two outer front draw bars 9 which project rearwardly from the outer ends of the cross bar 6 and are pivotally connected at their rear ends by pivots 10 with the outer parts of the front axles 2 so as to permit the front gangs of disks to swing horizontally.

In front of the rear gangs of disks is arranged a rear draft frame which in its preferred form comprises a horizontal cross bar 11 arranged in front of these gangs, two outer draw bars 12 which project rearwardly from the outer ends of this last-mentioned cross bar and are pivotally connected at their rear ends by pivots 15 with the outer parts of the rear axles so as to permit the rear gangs of disks to swing horizontally, a tongue projecting forwardly from the central part of the rear cross bar 11 and consisting of two forwardly converging bars 13 which have their outer front ends connected with each other and arranged underneath the rear end of the guide beam, and two braces 14 connecting the rear cross bar with the rear outer draw bars 15 and the tongue bars. The inner ends of the rear gangs of disks are pivotally connected with the rear end of the guide beam 5, this being preferably accomplished by means of two rear inner draw bars 16, 16 each of which is pivotally connected at its rear end by a pivot 17 with the inner end of one of the rear axles while its front end is provided with a longitudinal slot 18 which receives the cross pin 19 on the rear end of the guide beam, as shown in Figs. 1 and 2. Between the coupling pin 18 and the pivotal connections 17 the inner rear draw bars 16 are guided on the cross bar 11 on the rear draft frame by means of guide hangers 20 depending from this cross bar as shown in Figs. 1 and 2.

The main draft beam or bar 21 is adapted to be connected at its front end with a tractor or other means of propulsion in any suitable manner and has its rear part mounted on the front draft frame so as to be capable of longitudinal adjustment thereon. The preferred means which are shown in the drawings for affecting this adjustment consist in arranging the rear part of this draft beam between longitudinal flanges 22, 22 of the angle bars forming the main guide beam so that the draft beam is capable of sliding lengthwise on the guide beam but is held against lateral motion thereon. The central part of the draft beam is confined between the upper side of the guide beam and an upwardy projecting bracket 26 which bridges the guide beam and extends across the top of the draft beam as shown in Figs. 1, 2 and 4. On its central part the draft beam is provided with a longitudinal row of locking openings 24 one or the other of which is adapted to be engaged by a locking pin or bolt 25 which is guided with its upper part in the bracket 26 while its lower part enters an opening in the adjacent front part of the braces 7 of the front draft frame. By shifting the draft beam lengthwise on the guide beam of the front draft frame and engaging the locking pin with one or another of the locking openings in the draft beam the relative position of the draft beam and the front draft frame lengthwise of the harrow may be adjusted as required for varying the angle of the disk gangs relatively to the line of the draft.

On its rear end the draft beam is provided with a transverse guide plate 23 which overhangs the opposite longitudinal edges of the guide beam 5 and retains this part of the draft beam in its elevated position with reference to the guide beam.

In front of the guide plate 23 the main draft beam is provided on its upper side with a hook 27 which has its mouth opening forwardly. With this hook a coupling piece 28 is adapted to engage which preferably consists of a transverse bolt or pin having its central parts surrounded by a sleeve. This coupling piece is pivotally connected with the inner parts of the axles 2, 2, of the front disk gangs by means of two inner front draw bars 29, 29 each of which has its front end connected with one end of the coupling piece 28 while its rear end is pivotally connected by means of a vertical pin 30 with the inner part of the axle 2 of one of the front disk gangs. The intermediate parts of the front inner draw bars 29 are guided on the front draft frame by means of guidehangers 31 depending from the cross bar 6 on the front draft frame and embracing these draw bars, as shown in Figs. 1 and 2.

Slidable lengthwise in a longitudinal guideway formed between upper rear parts of the guide beam, 5, 5 is a slide 32 constructed in the form of a plate which is operatively connected with the coupling piece 28 by means of a connecting rod having a single rear section 33 connected with the front end of the plate 32 and a bifurcated front section 34, 34 which is connected with opposite ends of the coupling piece 28, as shown in Figs. 1 and 2. This coupling plate or slide is also pivotally connected with the front ends of the inner rear draw bars 13 by means of a coupling pin 35 projecting upwardly from the connected front ends of these bars and through an opening in the rear part of this coupling plate in which it is retained by means of a cotter pin 36 passing through this coupling pin above this slide, as shown in Figs. 1, 2 and 3.

When this harrow is to be drawn over the ground without doing any work as would be the case when shifting the same from one place to another the several parts are so adjusted that the axles of the several gangs of disks are arranged perpendicularly to the line of draft, these parts being held in this positions by shifting the draft beam into its foremost position on the front draft frame and locking the same in this position by engaging the locking bolt 25 with the rearmost locking opening of the draft beam. For the purpose of angularly adjusting the axis of the gangs of disks relative to the line of draft preparatory to harrowing or cultivating the soil over which the harrow is drawn the locking pin 25 is first lifted sufficiently to disengage the same from the opening of the draft beam with which it engages and then the latter is pushed rearwardly the desired extent relatively to the front draft frame, this being preferably accomplished by backing up the tractor with which the draft beam is connected. After this the locking pin is re-engaged with one or another of the locking openings in advance of the rear end of this row of openings, whereby a gap is formed between the coupling hook 27 and the coupling piece 28. Upon now starting the tractor ahead a forward pull is exerted upon the main draft beam and the front draft frame which is transmitted directly to the outer ends of the front gangs of disks through the medium of the outer front draw bars 9 and also to the inner ends of the rear gangs of disks through the medium of the inner rear draw bars 16 while the inner ends of the front gangs of disks and the outer ends of the rear gangs of disks lag behind until the coupling hook 27 of the main draft beam has advanced far enough to again engage with the coupling piece 28. During this initial forward movement of the tractor the disks of the front gangs are shifted into a position in which the same converge forwardly and the disks of the rear gangs diverge forwardly, as shown in Fig. 1 but during the continued forward movement of the harrow under the pulling effect of the tractor these gangs of disks remain in this position so that the front disks while operating upon the surface of the ground operate to deflect the same outwardly away from the longitudinal center of the harrow while the disks of the rear gangs operate to deflect the ground inwardly toward this longitudinal center line.

If it is desired to increase the harrowing effect of these disks the draft beam may be adjusted still farther backward on the front draft frame for increasing the angularity of the disks gang relatively to the line of draft.

For the purpose of again restoring the disk gangs into a position in which their axes are perpendicular to the line of draft preparatory to transporting the harrow without producing a cultivating effect the locking pin 25 is withdrawn from the main draft beam and a forward pull is exerted upon the main draft beam by means of the tractor until the inner ends of the front gangs of disks are pulled forwardly and the outer ends of the rear gangs of disks are also pulled in the same direction sufficiently to bring the axes of these disks into a position in which the same are arranged perpendicular to the line of draft, after which these parts are locked in this position by engaging the locking pin 25 with the appropriate opening 24 in the draft beam.

These means for adjusting the disk gangs are exceedingly simple and permit of effecting this adjustment without requiring any manual labor. Furthermore the same contain no delicate parts which are liable to get out of order but instead the same are of a sturdy construction which is capable of withstanding the severe strains to which they are subjected and still permit a quick and reliable adjustment.

I claim as my invention:

1. A harrow comprising two front gangs of cultivators, two rear gangs of cultivators, a front draft frame pivotally connected at its outer ends with the outer ends of said front cultivator gangs, a rear draft frame pivotally connected at its outer ends with the outer ends of said rear cultivator gangs, a main longitudinal draft beam adjustable lengthwise relatively to said front draft frame, and operatively connected with the inner ends of said rear cultivator gangs, and means for adjustably connecting the inner ends of said front cultivator gangs and said rear draft frame with said draft beam at different points in the length of the latter.

2. A harrow comprising two front gangs of cultivators, two rear gangs of cultivators, a front draft frame pivotally connected at its outer ends with the outer ends of said front cultivator gangs, a rear draft frame pivotally connected at its outer ends with the outer ends of said rear cultivator gangs, a main longitudinal draft beam adjustable lengthwise relatively to said front draft frame, rear inner draw bars pivotally connecting the inner ends of said rear cultivator gangs with the rear end of said front draft frame, and means for adjustably connecting the inner ends of said front cultivator gangs and said rear draft frame with said draft beam at different points in the length of the latter.

3. A harrow comprising two front gangs of cultivators, two rear gangs of cultivators, a front draft frame pivotally connected at its outer ends with the outer ends of said front cultivator gangs, a rear draft frame pivotally connected at its outer ends with the outer ends of said rear cultivator gangs, a main longitudinal draft beam adjustable lengthwise relatively to said front draft frame and operatively connected with the inner ends of said rear cultivator gangs, and means for adjustably connecting the inner ends of said front cultivator gangs and said rear draft frame with said draft beam at different points in the length of the latter, comprising a locking pin movably mounted on said front draft frame and adapted to engage with one or another of a longitudinal row of openings in said draft beam, a hook arranged on said draft beam and having its mouth opening forwardly, a coupling piece engaging with said hook, and inner draw bars connected at their front ends with opposite ends of said coupling piece and at their rear ends with the inner ends of said front cultivator gangs.

4. A harrow comprising two front gangs of cultivators, two rear gangs of cultivators, a front draft frame pivotally connected at its outer ends with the outer ends of said front cultivator gangs, a rear draft frame pivotally connected at its outer ends with the outer ends of said rear cultivator gangs, a main longitudinal draft beam adjustable lengthwise relatively to said front draft frame and operatively connected with the inner ends of said rear cultivator gangs, and means for adjustably connecting the inner ends of said front cultivator gangs and said rear draft frame with said draft beam at different points in the length of the latter, comprising a locking pin movably mounted on said front draft frame and adapted to engage with one or another of a longitudinal row of openings in said draft beam, a hook arranged on said draft beam and having its mouth opening forwardly, a coupling piece engaging with said hook, inner draw bars connected at their front ends with opposite ends of said coupling piece and at their rear ends with the inner ends of said front cultivator gangs, a coupling plate movable lengthwise on the rear part of said draft beam and pivotally connected with the inner part of said rear draft frame, and a central draft rod connected at its rear end with said plate and at its front end with said coupling piece, 5. A harrow comprising two gangs of cultivators, a draft frame arranged transversely in front of said gangs and pivotally connected at its outer ends with the outer ends of said gangs, a longitudinal draft beam movable lengthwise relatively to said draft frame and provided with a longitudinal row of openings and with a forwardly opening hook, a locking pin mounted on said frame and adapted to engage with one or another of said openings, a coupling piece engaging with said hook, and draw bars pivotally connecting opposite ends of said coupling piece with the inner ends of said cultivator gangs.

6. A harrow comprising two gangs of cultivators, a draft frame pivotally connected at its outer ends with the outer ends of said gangs, a longitudinal draft beam, a front draft frame with which said draft beam is adjustably connected, inner draw bars connecting the rear part of said front draft frame with the inner ends of said gangs, a coupling plate movable lengthwise on the rear part of said front draft frame and connected with said rear draft frame and said draft beam.

ARTHUR L. POLLARD.